United States Patent [19]
Miyamoto et al.

[11] Patent Number: 5,543,614
[45] Date of Patent: Aug. 6, 1996

[54] SCANNING PROBE MICROSCOPE CAPABLE OF SUPPRESSING PROBE VIBRATION CAUSED BY FEEDBACK CONTROL

[75] Inventors: Hirofumi Miyamoto, Niiza; Mitsugu Sakai, Tokyo; Mitsumori Hayashida, Tokyo; Nobuaki Sakai, Tokyo, all of Japan

[73] Assignee: Olympus Optical Co., Ltd., Tokyo, Japan

[21] Appl. No.: 327,193

[22] Filed: Oct. 21, 1994

[30] Foreign Application Priority Data

Oct. 25, 1993 [JP] Japan .................................. 5-266131

[51] Int. Cl.$^6$ .................................................. G01N 23/00
[52] U.S. Cl. .......................................... 250/234; 250/306
[58] Field of Search ...................................... 250/216, 561, 250/234, 235, 306, 307, 309, 310, 559.29, 559.4

[56] References Cited

U.S. PATENT DOCUMENTS 5,210,410  5/1993  Barrett .
5,323,003  6/1994  Shido et al. .

OTHER PUBLICATIONS

H. Kaizuka; "Application of Capacitor Insertion Method to Scanning Tunneling Microscopes"; Oct. 1989; pp. 3119–3122; 1989 American Institute of Physics; Rev. Sci. Instru. 60(10).

R. C. Barrett et al; "Optical Scan–Correction System Applied To Atomic Force Microscopy"; Jun. 1991; pp. 1393–1399; 1991 American Institute of Physics; Rev. Sci. Instru. 62(6).

*Primary Examiner*—Edward P. Westin
*Assistant Examiner*—Jacqueline M. Steady
*Attorney, Agent, or Firm*—Frishauf, Holtz, Goodman, Langer & Chick

[57] ABSTRACT

A scanning probe microscope having a probe for scanning a sample, a piezoelectric unit finely movable in the X, Y and Z directions, and a probe control unit for controlling a fine movement amount of the piezoelectric unit in the Z direction in accordance with a detected interaction between the sample and the probe. A driving unit applies a continuously changing voltage to the piezoelectric unit to drive the piezoelectric unit in one of an X and Y direction to scan along a scan line, a displacement detection unit detects the displacement of the piezoelectric unit along the scan line, and a matching detection unit outputs a coincidence detection signal when the detected displacement of the piezoelectric unit along the scan line coincides with target displacement values corresponding to desired measurement points. A surface data acquiring unit acquires sample surface data based on the Z-directional fine movement amount of the piezoelectric unit each time the matching detection unit outputs a coincidence detection signal.

21 Claims, 13 Drawing Sheets

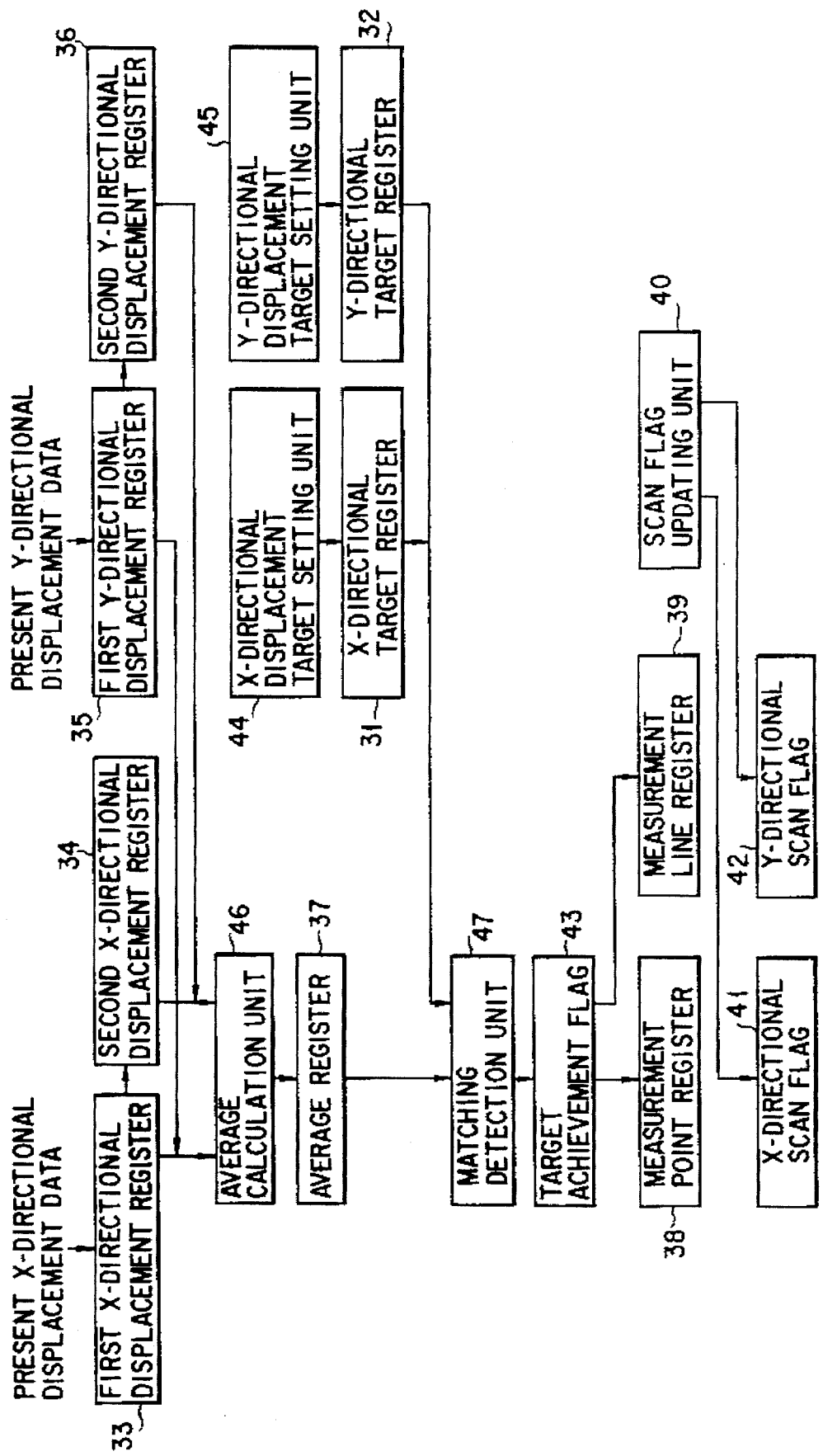
F I G. 4

SCANNING PROBE MICROSCOPE CAPABLE OF SUPPRESSING PROBE VIBRATION CAUSED BY FEEDBACK CONTROL

BACKGROUND OF THE INVENTION

1. Field of the Invention

The present invention relates to a scanning probe microscope capable of acquiring surface data of a sample by detecting an interaction between probe and sample while two-dimensionally scanning the surface of the sample.

2. Description of the Related Art

FIG. 10 shows a general scanning probe microscope (to be called as SPM hereinafter), in which the surface data of a sample 1 is acquired by detecting an interaction between the sample 1 and a probe 2 while two-dimensionally scanning the surface of the sample 1 by the probe 2. If the surface data is recess-and-projection data, the recess-and-projection state of the sample surface is displayed.

A sample stage 3, on which the sample 1 is placed, is fixed on the upper end surface of a cylindrical piezoelectric unit which can be finely moved in the Z direction (up and down direction), and X and Y directions (two directions crossing normal to each other in a horizontal plane which is perpendicular to the Z direction). The proximal end of the cylindrical piezoelectric unit 4 is fixed to a microscope body 5.

The cylindrical piezoelectric unit 4 consists of a cylindrical piezoelectric element and a plurality of pairs of electrodes each pair sandwiching the lateral surface of the piezoelectric element from the inner and outer sides. The piezoelectric element has characteristics in which the mechanical length varies in accordance with the magnitude of an applied voltage, and therefore the cylindrical piezoelectric unit 4 can be displaced in the Z, X or Y direction by selecting an electrode pair to which a voltage is applied, and adjusting the magnitude of the applied voltage. Jap. Pat. Appln. KOKAI Publication No. 63-236992 discloses a fine movement mechanism of the piezoelectric element which can move finely in the three-dimensional directions.

In the SPM shown in FIG. 10, the position of the probe in the Z direction is adjusted as a probe control unit 6 controls the voltage value of a scanning signal Sz applied to the cylindrical piezoelectric unit 4, the displacement of the probe in the X direction is adjusted as a feedback drive circuit 7 controls the voltage value of a drive signal Sz applied to the cylindrical piezoelectric unit 4, and the displacement of the probe in the Y direction is adjusted as a feedback drive circuit 8 controls the voltage value of a drive signal Dy applied to the cylindrical piezoelectric unit 4.

The instruction for scanning in the X and Y directions is supplied from a microcomputer 9 to the feedback drive circuits 7 and 8. In the case where the probe is moved in the X direction, the microcomputer 9 sends a scanning instruction signal D1, which linearly increases or decreases at a predetermined angle, to the feedback drive circuit 7. In the case where the probe is moved in the Y direction, the microcomputer 9 sends a scanning instruction signal D2, which linearly increases or decreases at a predetermined angle, to the feedback drive circuit 8.

It should be noted here that a general piezoelectric element has a hysteretic relationship between an applied voltage and a change in the mechanical length, as shown in FIG. 12. Therefore, conventionally, the feedback control is carried out by the feedback drive circuits 7 and 8. More specifically, in order to detect the displacement of the sample stage 3, an X direction displacement sensor 10 and a Y direction displacement sensor 11 for detecting the displacements in the X and Y directions are provided as shown in FIG. 11. The displacement sensor shown in FIG. 11 is of an optical reflection type in which sensor light is irradiated on the lateral surface of the sample stage 3 by using optical fibers 10a and 11a, and the displacement is detected from the intensity of reflection.

The feedback drive circuit 7 and 8 receive displacement detection signals from the X-directional displacement sensor 10 and the Y-directional displacement sensor 11 at a predetermined cycle, and drive signals Dx and Dy are subjected to the feedback control so that the waveform of the displacement detection signal becomes the same as that of the scan instruction signal.

Meanwhile, the Z-directional distance between the sample 1 and the probe 2 is detected by a probe displacement detection unit 15 at all times. For example, the Z-directional displacement of the probe 2 is detected by the known optical lever method, and a displacement detection signal Pz is input to the probe control unit 6. The probe control unit 6 controls the voltage value of a scan signal Sz so that the probe is at a target Z position when the displacement detection signal Pz varies. Further, in response to a request from the microcomputer 9, a Z position control data D3 (corresponding to scan signal Sz) formed by the probe control unit 6 is supplied to the microcomputer 9, and image data D4 obtained by converting the Z position control data D3 into sample surface data is sent from the microcomputer 9 to the host computer 16. Thus, the sample surface image is displaced on the screen of the host computer 16.

Thus, the distortion of the sample surface data image which is caused by the hysteretic relationship between the applied voltage to the piezoelectric unit and the displacement is removed, and an image having a high linearity is obtained by a host computer.

The conventional SPM described above has a high resolution of displacement of the piezoelectric unit 4 of about 0.01 nm; however the displacement detection resolutions of the displacement sensors 13 and 14 are significantly degraded, i.e. as low as several nm. In the meantime, noise is superimposed on displacement detection signals of the displacement sensors 13 and 14. When the feedback drive circuits 7 and 8 sample these displacement detection signals at a predetermined time, a waveform having crests and troughs of noise are regionally repeated without increasing (or decreasing) the displacement detection signal linearly. When the voltage values of drive signals Dx and Dy are controlled by comparing the displacement detection signal and the scan instruction signal with each other, the piezoelectric unit 4 is finely vibrated and the tip end of the probe 2 and the surface of the sample 1 collide with each other, possibly causing damages to both.

Although the conventional SPM potentially has an excellent capability to obtain image data by a high resolution of its piezoelectric unit, the resolution of the image is degraded to a level of the resolutions of the displacement sensors 13 and 14 when the surface data of the sample 1 is visualized.

SUMMARY OF THE INVENTION

The object of the present invention is to provide a scanning probe microscope which can prevent the vibration generated by the noise of displacement sensors and provide a sample surface image having a high resolution and a high linearity, without being influenced by a hysteretic relationship between a voltage applied to the piezoelectric unit and movement thereof.

The SPM of the present invention includes: a piezoelectric unit capable of finely moving along the Z axis coinciding with the axis along with the sample and probe face to each other, and along the X axis normal to the Z axis; and a probe control unit for controlling the fine movement amount of the piezoelectric unit in the Z direction by detecting an interaction between the sample and the probe and outputting a Z directional control signal having a voltage value corresponding to the magnitude of the interaction detected.

The SPM further includes: an X-directional driving unit for outputting an X-directional scan signal for controlling the X-directional fine movement amount of the piezoelectric unit and continuously changing the voltage value of the X-directional scan signal while the flag is in the first state; an X-directional displacement detection sensor for detecting a displacement of the piezoelectric unit in the X direction and outputting an X-directional displacement detection signal corresponding to the displacement detected; a matching detection unit for acquiring the X-directional displacement detection signal and maintaining the flag in the first state until the X-directional displacement amount indicated by the signal value coincides with an X-directional displacement target value determined by the X-directional fine movement amount; and a surface data acquiring unit for acquiring a signal value of the Z-directional control signal from the probe control unit as the surface data when the matching detection unit detects that the X-directional displacement amount coincides with the X-directional displacement target value.

In the SPM of the present invention, the piezoelectric unit is finely moved by the X-directional drive unit during an X-directional scan, and X-directional displacement amounts are detected at a constant cycle by the X-directional displacement detection sensor. The matching detection unit continuously monitors the X-directional amount during the X-directional scan, and detects whether or not the X-directional displacement amount coincides with the X-directional displacement target value. When the X-directional displacement amount coincides with the X-directional displacement target value, the Z position control data at that particular point is acquired from the probe control unit as the surface data.

As the X-directional displacement target value is updated each time the X-directional displacement amount coincides with the X-directional displacement target value, Z-directional control data items at a number of measurement points on an X-directional scan line can be obtained.

Since no feedback control is applied to the X-directional displacement of the piezoelectric unit, the piezoelectric unit is not vibrated even if noise is contained in a displacement detection signal of the X-directional displacement detection sensor.

The SPM of the present invention further includes an averaging unit for sampling X-directional displacement detection signals output from the X-directional displacement sensor at a constant time cycle, averaging every certain set of consecutive sampling values obtained by the sampling, and supplying the average value to the matching detection unit as the X-directional displacement amount.

According to the SPM of the present invention, every certain set of consecutive sampling values obtained by sampling are averaged, and therefore the influence of noise contained in a displacement detection signal can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram showing the register/flag structure in the SPM of the embodiment;

DETAILED DESCRIPTION OF THE PREFERRED EMBODIMENTS

Embodiments of the present invention will be described.

Figure 1:
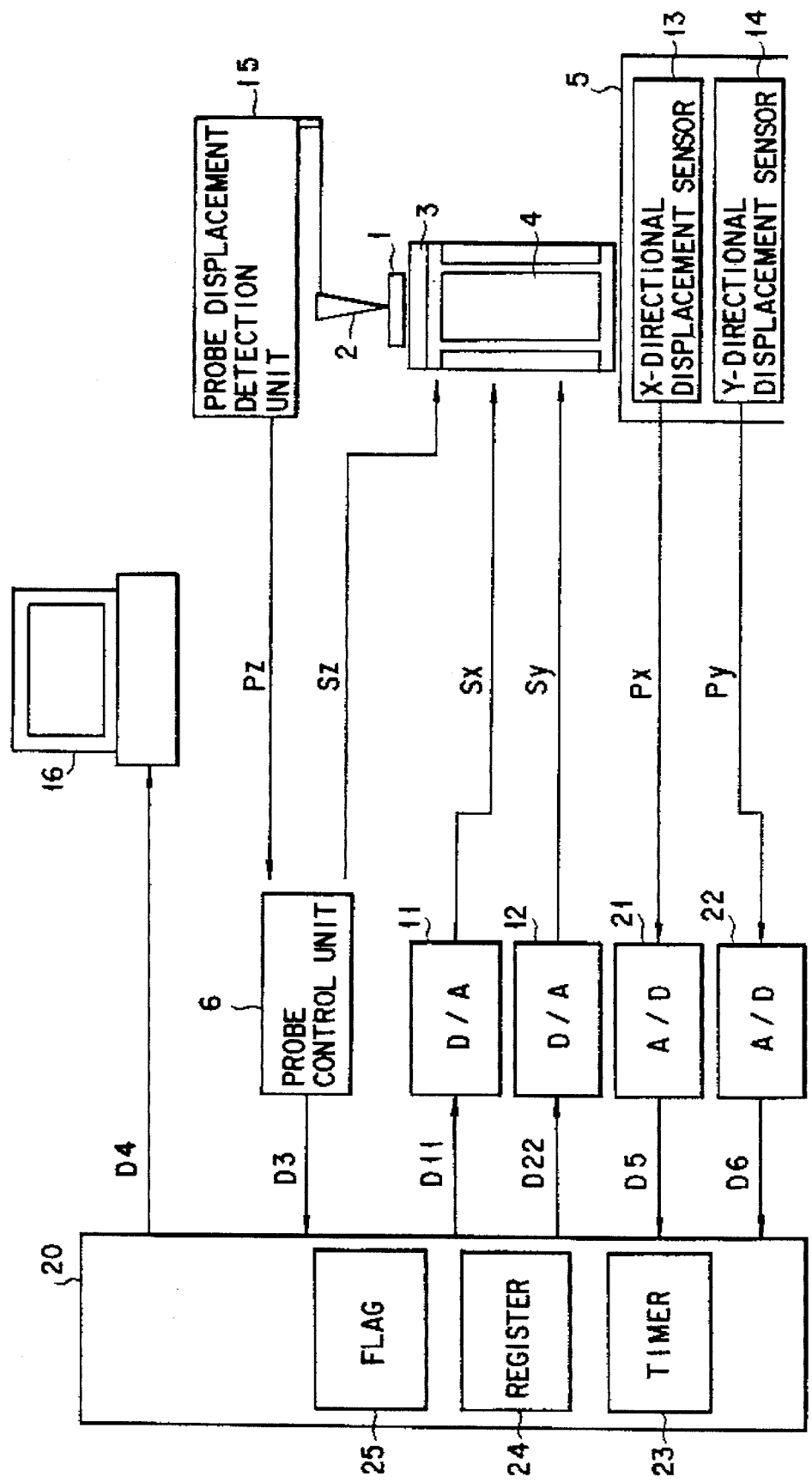
FIG. 1 shows a diagram showing the structure of an SPM according to an embodiment of the present invention.
Figure 10:
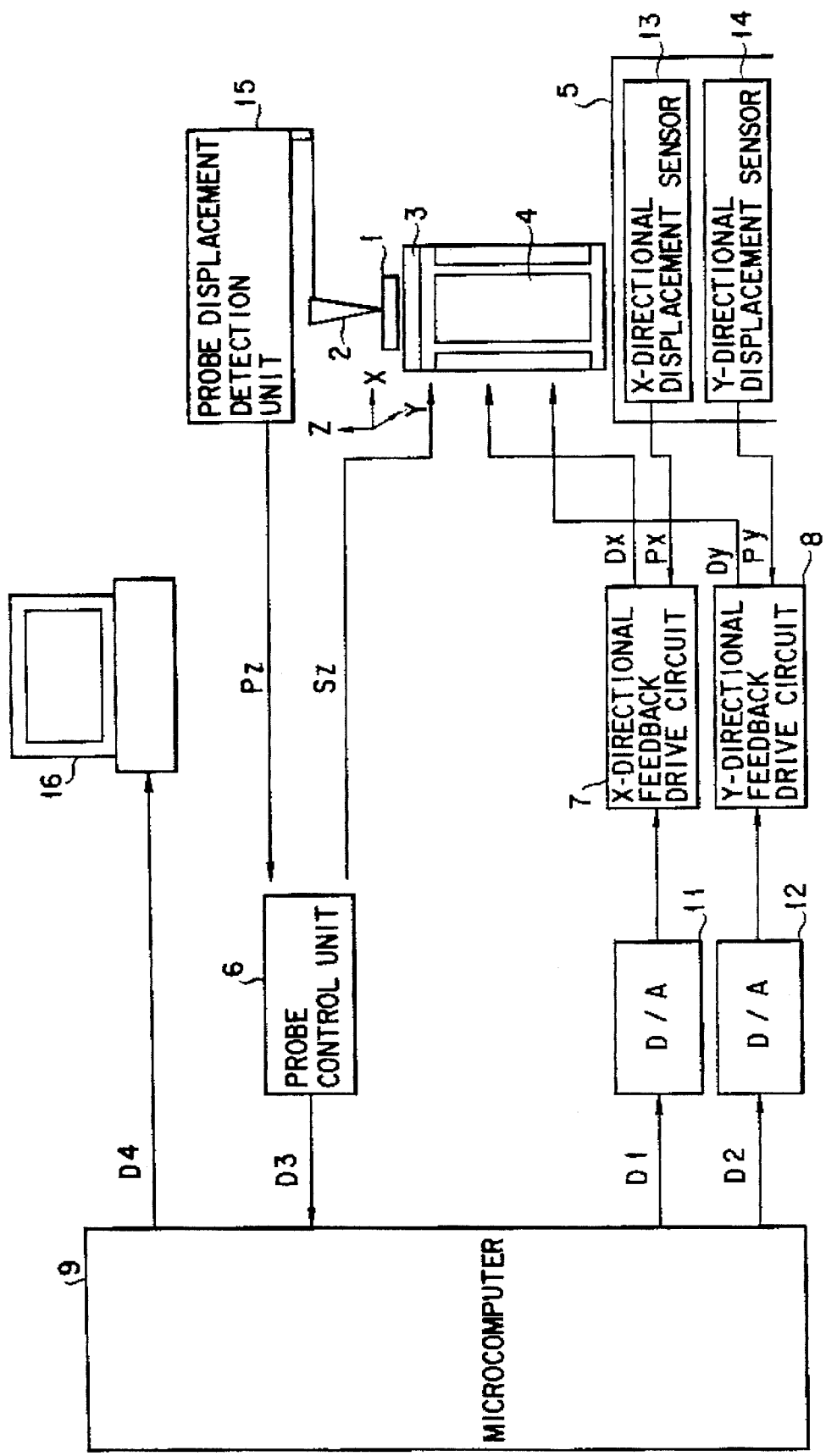
FIG. 10 is a diagram showing a conventional SPM.
Figure 11:
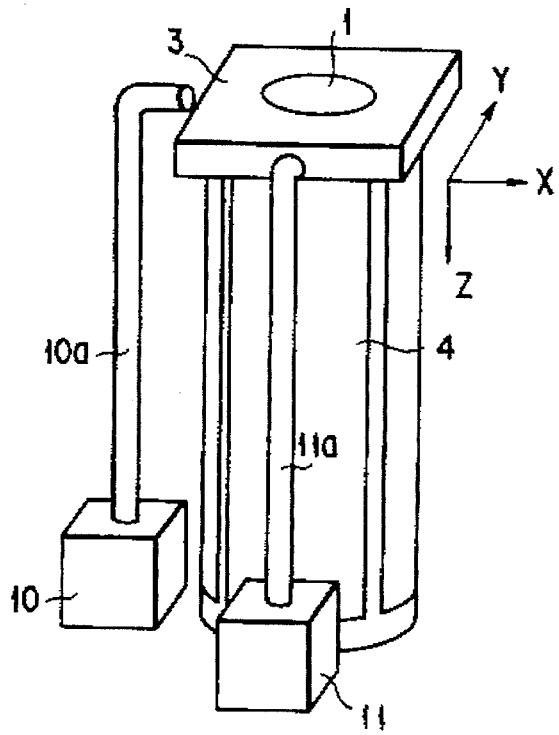
FIG. 11 is a diagram illustrating a cylindrical piezoelectric unit and a displacement sensor.
Figure 12:
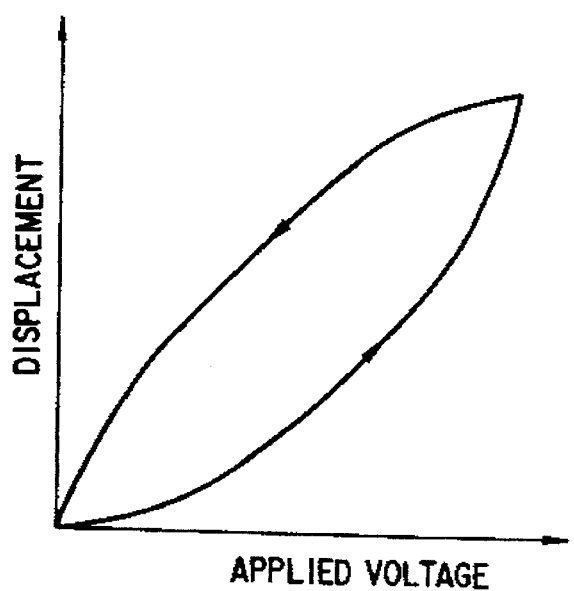
FIG. 12 is a diagram showing the hysteretic relationship of the piezoelectric unit.

FIG. 1 is a schematic diagram showing the structure of an atomic force microscope as an embodiment of the SPM of the present invention. In this figure, elements having the same functions as those shown in FIG. 10 are designated by the same reference numerals.

In the SPM of this embodiment, an analog input terminal of an A/D converter 21 is connected to an output terminal of an X-directional displacement sensor 13, and an analog input terminal of an A/D converter 22 is connected to an output terminal of a Y-directional displacement sensor 14. The A/D converter 21 converts an X-directional displacement detection signal Px into an X-directional detection data item D5 expressed in a predetermined bits. The A/D converter 22 converts a Y-directional displacement detection signal Py output from the displacement sensor 14, into a Y-directional displacement detection data item D6. A microcomputer 20 is connected to the digital output terminals of the A/D converters 21 and 22.

Figure 2A:
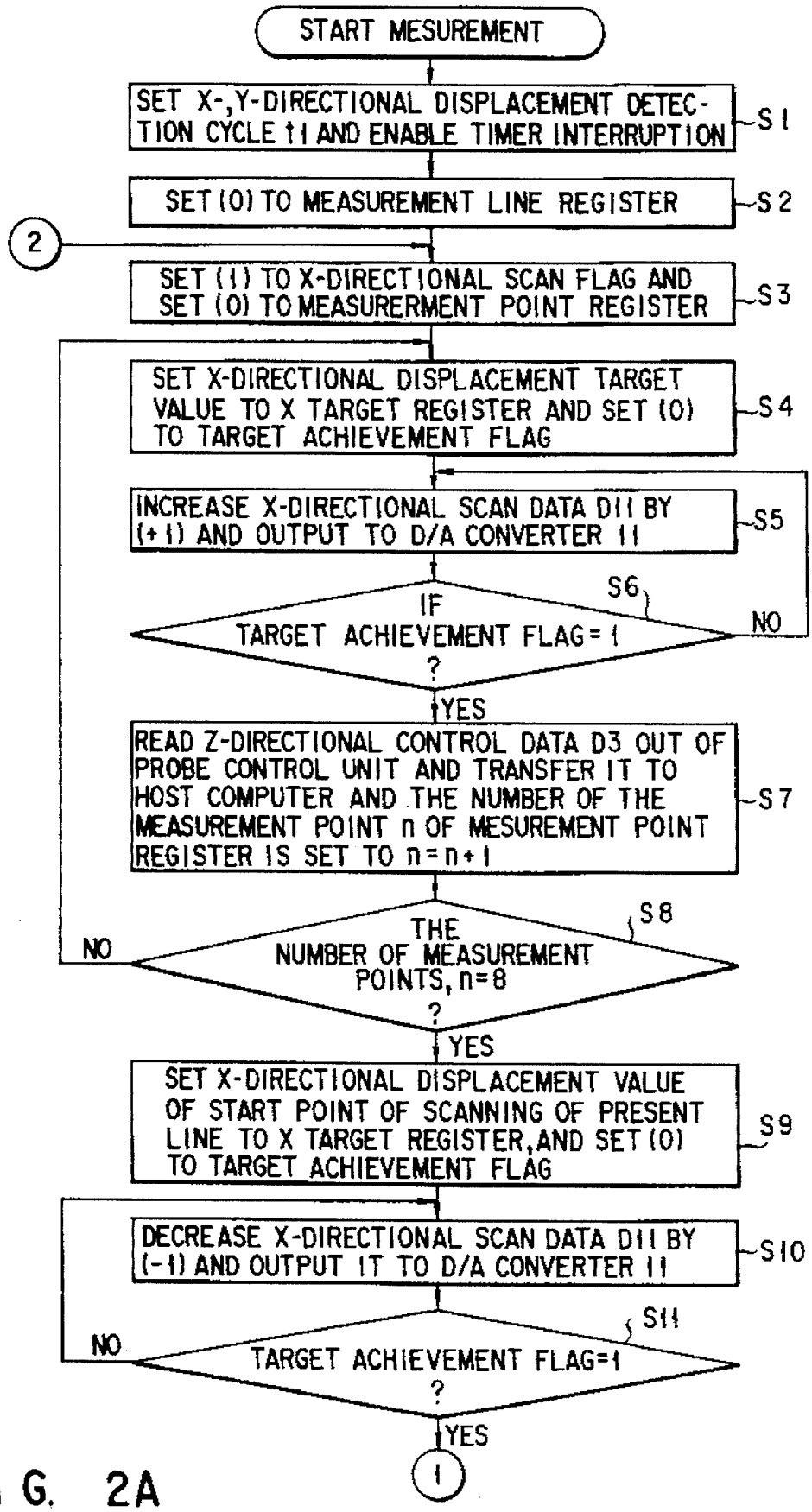
FIGS. 2A and 2B are flowcharts each showing an acquiring process of surface data in the SPM of the embodiment.
Figure 2B:
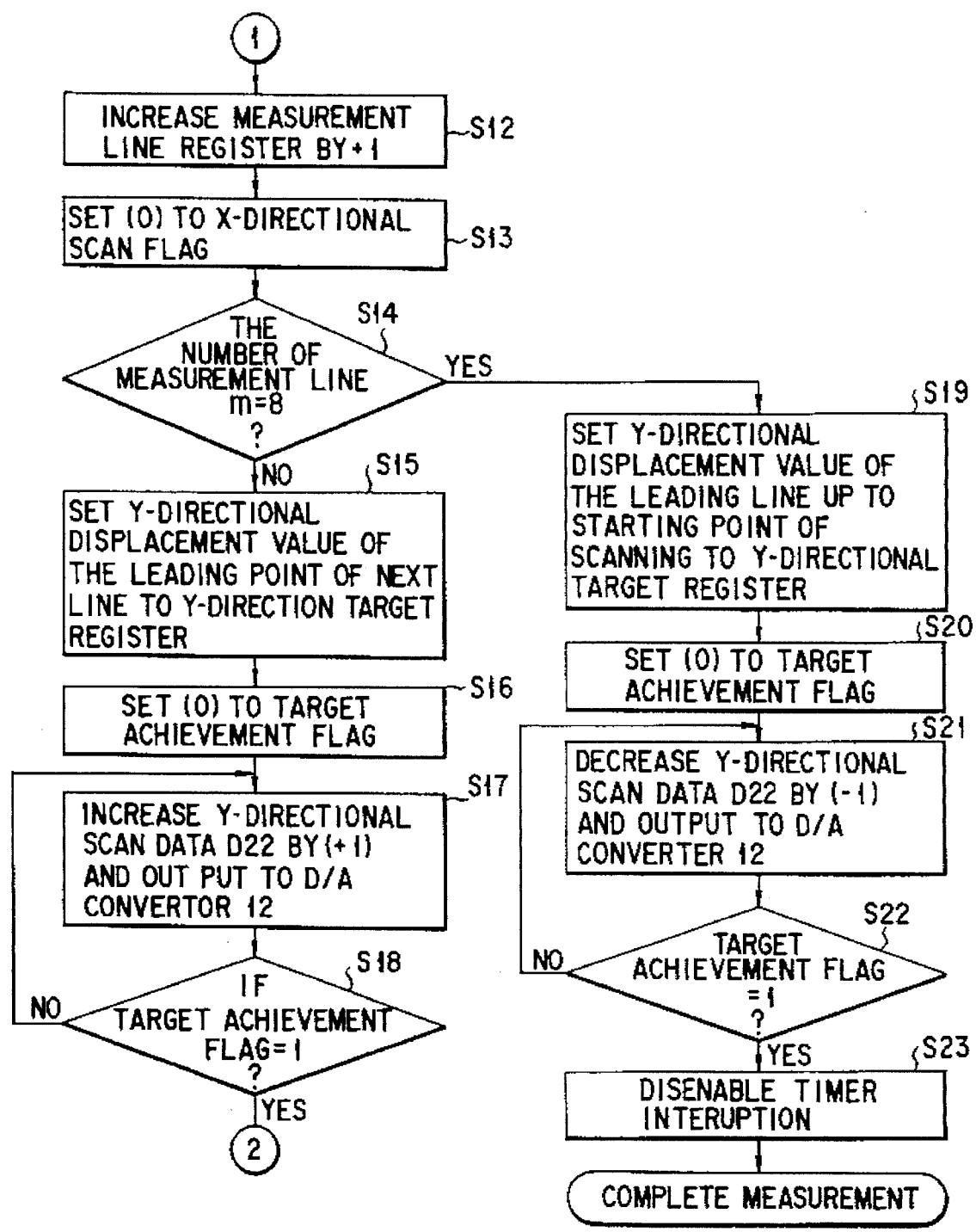
Figure 3:
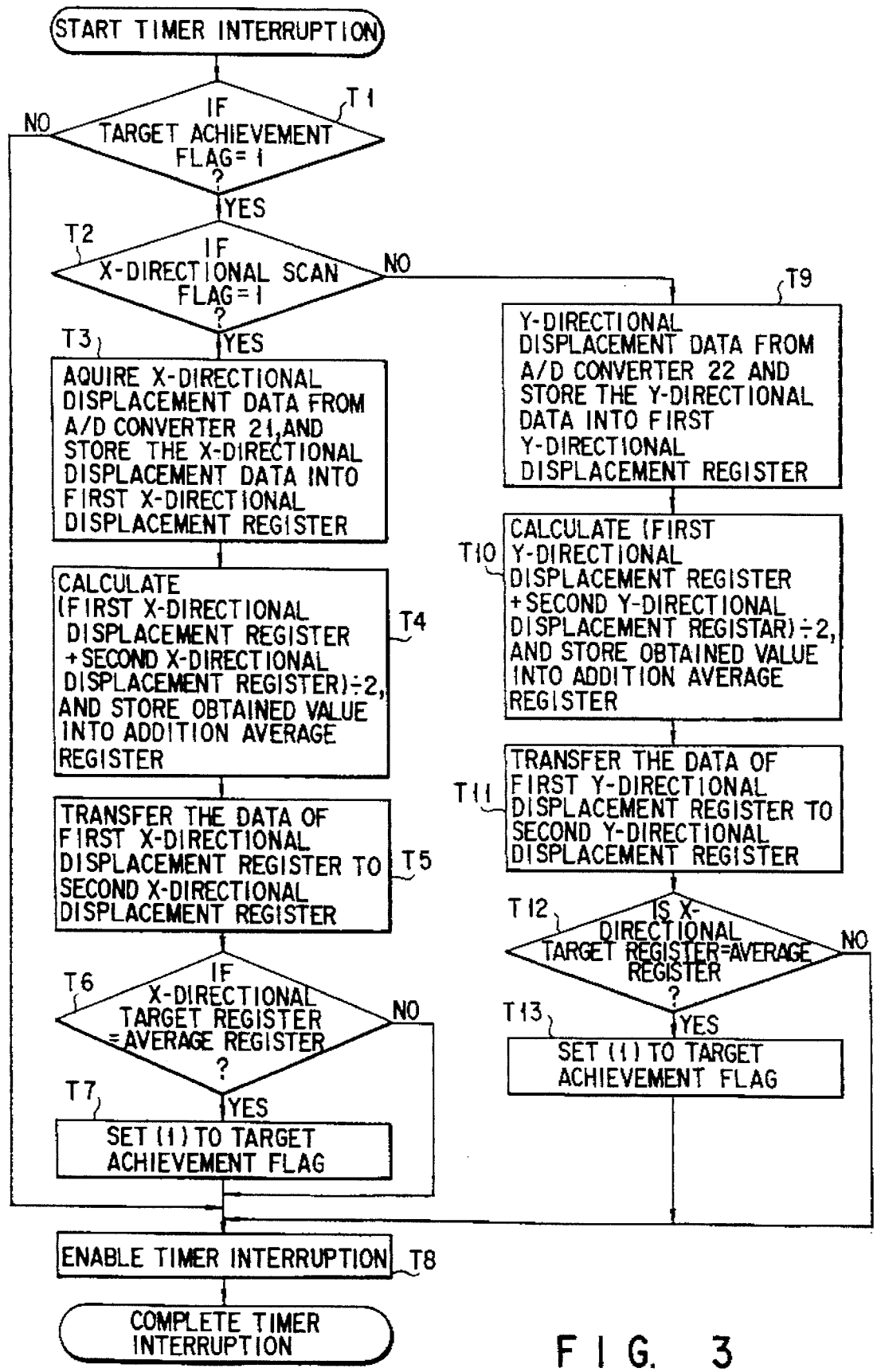
FIG. 3 is a flowchart each showing timer interruption in the SPM of the embodiment.

The microcomputer 20 comprise a ROM storing measurement sequence programs shown in FIGS. 2A, 2B and FIG. 3 in flowcharts, a timer 23 for periodically generating an interruption process shown in FIG. 3, various types of registers 24 for storing data items acquired or generated in a measurement sequence, and flags 25 showing a scanning state.

FIG. 4 is a diagram showing a sequence structure of the microcomputer 20, consisting of the registers 24 and the flags 25. The registers 24 are, specifically, an X-directional target register 31, a Y-directional target register 32, a first X-directional displacement register 33, a second X-directional displacement register 34, a first Y-directional displacement register 35, a second Y-directional displacement register 36, an average register 37, a measurement point register 38 and a measurement line register 39. The flags 25 are, specifically, an X-directional scan flag 41, a Y-directional scan flag 42 and a target achievement flag 43.

The X-directional target register 31 stores an X-directional displacement target data item D11 from an X-directional target setting unit 44. The Y-directional target register 32 stores an Y-directional displacement target data item D22 from a Y-directional target setting unit 45.

In the first X-directional displacement register 33, the present X-directional displacement data item D5 is stored, whereas in the second X-directional displacement register 34, the immediately preceding X-directional displacement data item D5 is stored. In the average register 37, the average value of the preceding X- and Y-directional displacement data items D5 and D6 (preceding X- and Y-directional displacement data items) and the present X- and Y-directional displacement data items D5 and D6 (present X- and Y-directional displacement data items) is stored. In the measurement point register 38, the number of measurement points which have been measured on each scan line is stored. In the measurement line register 39, the number of lines which have been measured is stored.

In the X-directional scan flag 41, (1) is set during a period of scanning in the X direction, whereas (0) is set during a period of no scanning in the X direction. In the Y-directional scan flag 42, (1) is set during a period of scanning in the Y direction, whereas (0) is set during a period of no scanning in the Y direction. In the target achievement flag 43, (1) is set when the probe reaches the displacement target position, whereas (0) is set until the probe reaches the target position.

The average value to be set to the average register 37 is calculated by an average calculation unit 46, which is a functional block in terms of flowchart. The flag to be set to the target achievement flag 43 is set by the matching detection unit 47, which is a functional block in terms of flowchart. The X-directional and Y-directional scan flags 41 and 42 are controlled by a scan flag control unit 40.

Figure 6A:
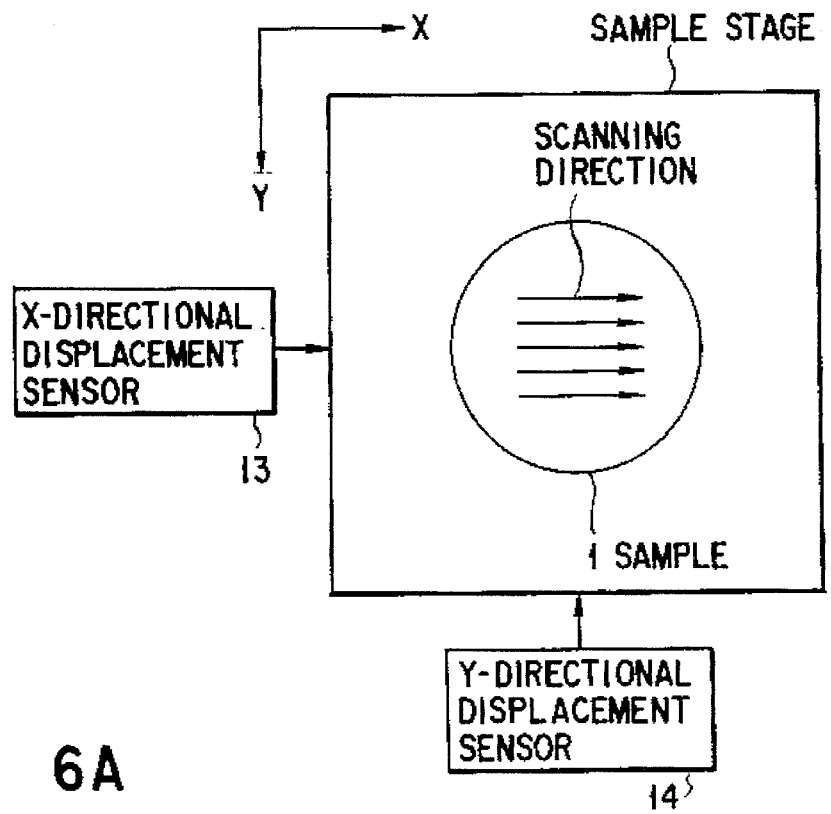
FIGS. 6A and 6B are diagrams each illustrating the direction of two-dimensional scan.

The operation of the SPM in the case where the piezoelectric unit 4 is driven so that the scan of the sample 1 by the probe 2 is carried out temporally alternately in the X and Y directions as shown in FIG. 6A, will be described.

Figure 5:
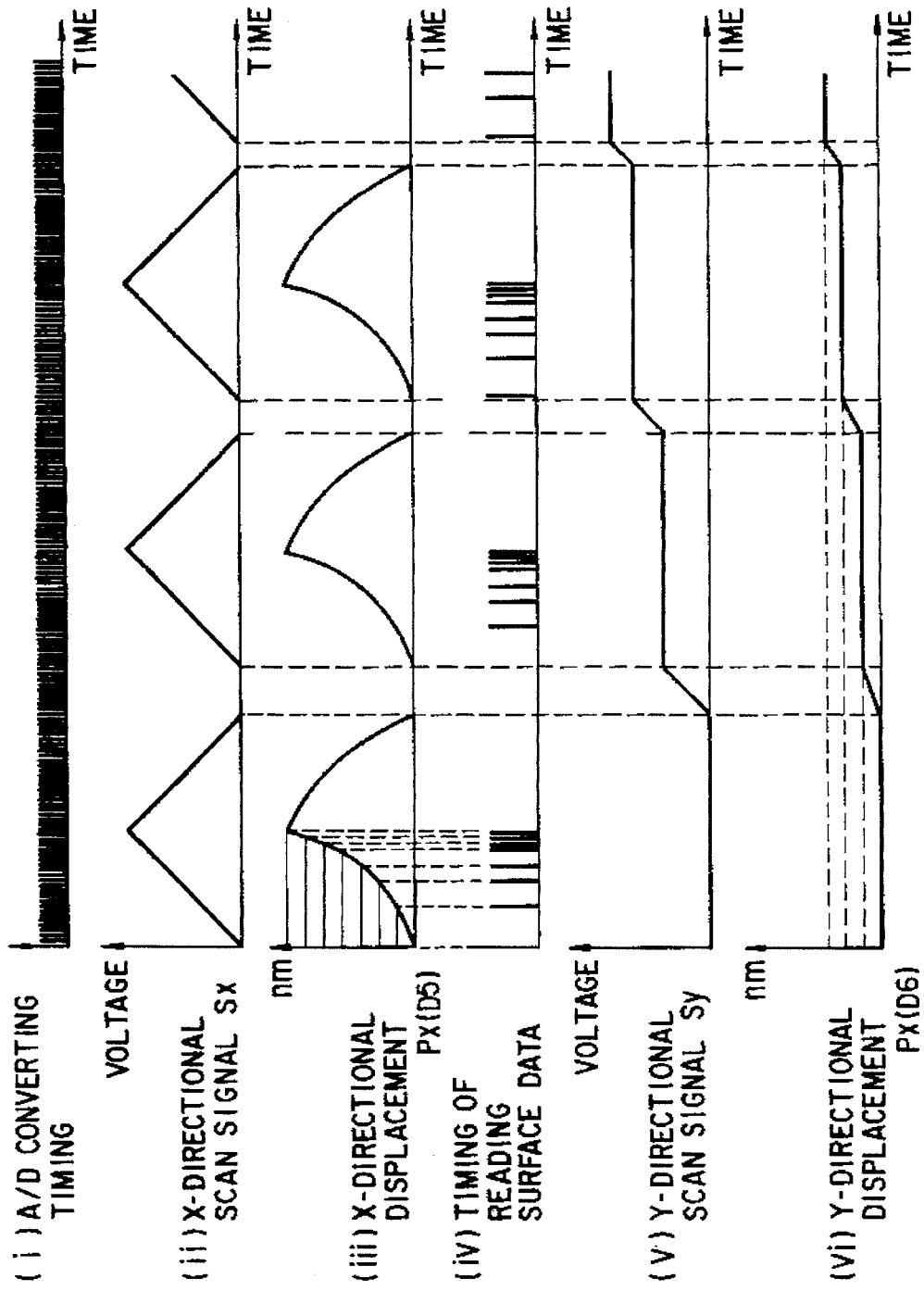
FIG. 5 is a timing chart for a two-dimensional scanning of the SPM of the embodiment.

For carrying out the X-Y scan shown in FIG. 6A, the X-directional displacement target setting unit 44 and the Y-directional displacement setting unit 45 update the displacement target value so as to generate the X-directional displacement target setting unit 44 and the Y-directional target setting unit 45 at the timing shown in FIG. 5 (ii) and (v). Here, the number of measurement lines is set to 8, and the number of measurement points on one line, n, is set to 8. In order to reduce the noise contained in displacement detection signals Px and Py output from the X- and Y-directional displacement sensors 13 and 14, two successive displacement detection values are averaged.

In this embodiment, the measurement sequences shown in the flowcharts of FIGS. 2A and 2B are always activated, and upon the timer interruption, the sequences shown in the flowcharts of FIG. 3 are executed at the same timing as the A/D conversion.

The measurement of the surface shape of the sample 1 starts in the state where the tip end of the cantilever (prove) 2 is situated at the leading end of the first scan line. The X- and Y-directional displacement data items D5 and D6 of the leading point of the first scan line are initially set to the first X-directional displacement register 33 and the first Y-directional displacement register 35.

In a process of step S1, the sampling interval (cycle of t1) optimum for acquiring outputs from the displacement sensors 13 and 14 is set to the timer 23. For example, t= 20 μsec is set to the timer 23 as the A/D conversion timing illustrated in FIG. 5 (i). Further, the SPM is set such that the interruption of the timer can be accepted.

Next, an initial value (0) is set to the measurement line register 39 (step S2). Subsequently, a value (1), which indicates the scanning is carried out in the X direction, is set to the X-directional scan flag 41, and the initial value (0) is set to the measurement point register 38 (step S3).

Next, the X-directional displacement target value, which expresses the displacement Δd from the present point to the next measurement point, is set to the X-directional target register 31 from the X-directional displacement target setting unit 44, and a value (0), which indicates the target point is not yet achieved, is set to the target achievement flag 43 (step S4). The X-directional displacement target value is increased by the displacement Δd, which is added to the present measurement point until the measurement point, n, reaches 8 (n= 8).

In a process of step S5, when the X-directional displacement target value is set to the X-directional target register 31 and a value (0) is set to the target achievement flag 43, the voltage of an X-directional scan signal Sx output from the D/A converter 11 is increased by increasing the X-directional scan data D11 applied to the D/A converter 11. When the voltage of the X-directional scan signal Sx is increased, the piezoelectric unit 4 finely moves in the X direction.

Next, it is judged whether or not the target achievement flag 43 set to (0) in the step S4 is changed to (1) (step S6). Further, until the target achievement flag 43 becomes (1), the increment of the X-directional scan data D11 is repeated and the movement amount of the piezoelectric unit 4 in the X direction is increased in the process of step S5. The X-directional displacement is as shown in FIG. 5 (iii).

When it is confirmed that the displacement in the X direction achieves the X-directional displacement target value by the detection of the target achievement flag= (1) in the judgment of step S6, the step proceeds forward to a process of step S7.

During the confirmation, the probe displacement detection unit 15 detects the displacement of the probe 2 by the known optical lever method, and a displacement detection signal Pz is output to the probe control unit 6. The probe control unit 6 acquires the displacement detection signal Pz from the probe displacement detection unit 15, and applies the Z-directional scan signal Sz, which is controlled to make the interaction constantly between the probe 2 and the sample 1, to the electrode of the piezoelectric unit 4.

In the process of step S7, when the target achievement flag is (1), the displacement detection signal Pz is read out from the probe control unit 6 and transferred to the host computer 16 as a measurement data item D4. Then, the number of measurement points, n, of the measurement point register 38 is increased by 1.

Consequently, the displacement of the cantilever 2 at the time of achieving the Z-directional displacement target value, that is, the recess-and-projection data of the sample surface at the measurement point after moving by the X-directional displacement target value, is transferred to the host computer 16.

In a process of step S8, it is judged whether or not all measurement points on a given line have been achieved. In this embodiment, the number of the measurement points on one line is 8, the processes of steps S4 to S8 are repeated while the number of measurement points, n, of the measurement point register 38 is increased until n= 8.

In the process of step S8, if it is judged whether or not all the measurement points on the line are achieved, the X-directional displacement target value, which is the distance to the position of the scan starting point on the present line, is set to the X-directional target register 31, and the state (0) is set to the target achievement flag (step S9).

Next, the X-directional scan data item D11 is decreased, and output to the D/A converter 11 so as to reduce the voltage of the X-directional scan signal Sx (step S10). Then, it is checked whether or not the target achievement flag is set at the state (1) (step S11). If the flag is not set at (1), the decrement of the X-directional scan data item D11 is repeated by the process of step S10 so as to gradually decrease the voltage of the X-directional scan signal Sx. If the flag is set at (1), it indicates that the probe reaches the scan starting position in the X direction.

More specifically, in the processes of steps S4 to step S11, the voltage of the X-directional scan signal Sx increases at a constant rate from the scan starting point until the number of measurement points, n, becomes n= 8. After that, until the number of measurement points, n, becomes n= 8 once again, the voltage is decreased at a constant rate. Therefore, a waveform of the angled shape shown in FIG. 5 (ii) is obtained. Further, the surface data of the sample 1 is acquired each time the X-directional displacement data D5 coincides with the X-directional displacement target value, which is changed by a constant displacement width "$\Delta d$ as shown in FIG. 5 (iv).

As described, a feedback control based on the comparison between the sampling value of the displacement detection signal Px containing noise and the X-directional scan signal is not carried out, and therefore the drawback of generating vibration caused by the noise of the displacement detection signal Px is completely removed.

Next, the measurement line is shifted in the Y direction by 1. Therefore, the number of lines of the measurement line register 39 is increased (step S12), and the state (0) is set to the X-directional scan flag 41 to switch to the Y-directional scan (step S13).

Then, it is checked whether or not the number of measurement lines, m, of the measurement line register 39 is 8 (step S14), and if the number of measurement lines, m< 8, the Y-directional displacement target value up to the leading point of the next line is set to the Y-directional target register 32 (step S15). At the same time, the state (0) is set to the target achievement flag 43 (step S16).

Next, the Y-directional scan data items D22 is increased so as to increase the voltage of the Y-directional scan signal Sy output from the D/A converter 12. Consequently, the piezoelectric unit 4 fine moves so that the sample 1 is scanned by the probe 2 in the Y direction. Then, it is checked whether or not the state (1), which indicates that the target value is achieved, is set to the target achievement flag 43 (step S18). If the state (1) is not set, the process of step S17 is executed again to repeat the increment of the Y-directional scan data item D22, thus increasing the voltage of the Y-directional scan signal Sy, as shown in FIG. 5 (v). The Y-directional displacement at this point is as shown in FIG. 5 (vi).

In the process of step S18, when the target achievement flag 43 is detected to be set at (1), it is considered that the probe has reached the scan starting point of the next line, and therefore the measurement is shifted to the next line. That is, the processes of steps S3 to S14 are executed.

In the process of step S14, if it is detected that the number of measurement lines, m, has become 8 (m= 8), the measurement of all the scan lines is considered to be completed, and therefore the displacement state is returned to the first scan line. In other words, the Y-directional displacement value up to the scan starting point of the first scan line is set to the Y-directional target register 32 as a Y-directional displacement target value (step S19), and the state (0) is set to the target achievement flag 43 (step S20).

Next, the Y-directional scan data item D22 is decreased so as to decrease the voltage of the Y-directional scan signal Sy output from the D/A converter 12 (step S21). Then, it is checked whether or not the target achievement flag 43 is set at (1) (step S22). Until the target achievement flag 43 is set at (1), the decrement of the Y-directional scan data D22 is repeated to reduce the voltage of the Y-directional scan signal Sy. When the target achievement flag 43 is set at (1), it is considered that the probe has reached the scan starting point of the leading line. Lastly, the timer interruption is disenabled, thus completing the measurement.

In similar to the case of the X-directional scanning, also in the Y-directional scan, the Y-directional displacement data D6 is acquired in synchronous with an A/D converting cycle t1 while increasing (or decreasing) the Y-directional scanning signal Sy, and the Y-directional scanning is stopped when the Y-directional displacement data D6 coincides with the Y-directional displacement target value, making it possible to prevent the drawback caused by the vibration of the piezoelectric unit 4.

In the meantime, the timer interruption process illustrated in FIG. 3 is executed in synchronous with the A/D converting timing for acquiring displacement data items D5 and D6.

First, in a process of step T1, the state of the target achievement flag 43 is checked. If the state (1), which indicates that the displacement target is achieved, is set to the flag, the process proceeds on to step T8, whereas if the state (0), which indicates that the probe has not yet reached the displacement target, is set, it is checked whether or not the X-directional scan flag 41 is at (1) (step T2). If the state (0), which indicates that the probe is not scanning in the X direction, the process proceeds on to step T9, which is designed for the Y-directional displacement detection. If the state (1), which indicates that the probe is scanning in the X direction, is set, an X-directional displacement data item D5 obtained by A/D-converting the X-directional displacement signal Px in synchronous with a A/D converting cycle of t1, is acquired from the A/D converter 21, and is stored in the first X-directional displacement register 33 (step T3).

Next, the average calculation unit 46 takes an average of the immediately preceding X-directional displacement data (previous X-directional displacement data) D5 stored in the second X-directional displacement register 34 and the X-directional displacement data (present X-directional displacement data) D5 stored in the first X-directional displacement register 33 and acquired by the present timer interruption process, and the average value is stored in the average register 37 (step T4).

That is, the X-directional displacement of the sample stage 2 is measured by the displacement sensor 13 at all times, and displacement data items D5 is acquired a plurality of times at a cycle of t1. The average value of these consecutive displacement data items D5 is regarded as the data expressing the present X-directional displacement. In this embodiment, a plurality of consecutive displacement data items D5 which are acquired at a cycle of t1 are averaged, thus making it possible to reduce the adverse influence of the noise contained in the displacement detection signal. As in the conventional technique, if the sampling value at a certain point is regarded as displacement data, a great difference in displacement value results between the case where the crest of the noise is sampled and the case where the trough of the noise is sampled.

Next, the present X-directional displacement data stored in the first X-directional displacement register 33 is stored in the second X-directional displacement register 34 (step T5).

Then, the matching detection unit 47 checks whether or not the X-directional displacement target value stored in the X-directional target register 31 and the average value stored in the average register 37 (step T6), and if both values coincides with each other, the state (1) is set to the target achievement flag 43 (step T7). In the case where both values are not equal to each other, the process proceeds on to step T8 while the target achievement flag 43 being set at (0). In step T8, the timer interruption is enabled and the timer interruption process is completed.

In the case where it is judged that the X-directional scan is completed in the process of step T2, the process proceeds on to step T9, where the Y-directional displacement data item D6 obtained by A/D converting the Y-directional displacement signal Py is acquired from the A/D converter 22 and the Y-directional displacement data item D6 is stored in the first Y-directional displacement register 35.

Next, the average calculation unit 46 takes an average of the immediately preceding Y-directional displacement data (previous Y-directional displacement data) D6 stored in the second Y-directional displacement register 36 and the Y-directional displacement data (present Y-directional displacement data) D6 stored in the first Y-directional displacement register and acquired by the present timer interruption process, and the average value is stored in the average register 37 (step T10). Next, the present Y-directional displacement data stored in the first Y-directional displacement register 35 is stored in the second Y-directional displacement register 36 (step T11). Then, the matching detection unit 47 checks whether or not the Y-directional displacement target value stored in the Y-directional target register 32 and the average value stored in the average register 37 (step T12) match, and if both values coincides with each other, the state (1) is set to the target achievement flag 43 (step T13). In the case where both values are not equal to each other, the process proceeds on to step T8 while the target achievement flag 43 being set at (0), where the timer interruption is enabled (step T8) and the timer interruption process is completed.

As described, according to this embodiment, the displacement detection signals Px and Py of the displacement sensors 13 and 14 are fetched into the microcomputer 20 via the A/D converters 21 and 22 for monitoring. When the displacement detection signal Px becomes equal to the X-directional displacement target value while linearly increasing (or decreasing) the X-directional scan signal Sx, the Z-position control data item D3 is acquired from the probe control unit 6. Therefore, even if the displacement detection signal Px contains noise, the piezoelectric unit 4 is prevented from being vibrated in an undesired manner.

According to this embodiment, the displacement detection signals Px and Py output from the displacement sensors 13 and 14 are fetched into the microcomputer 20, and a plurality of consecutive displacement data items are averaged. Therefore, the influence of the noise contained in the displacement detection signals Px and Py can be reduced, and the sample surface data measurement having a high resolution, a high linearity and a high accuracy, can be achieved.

Figure 6B:
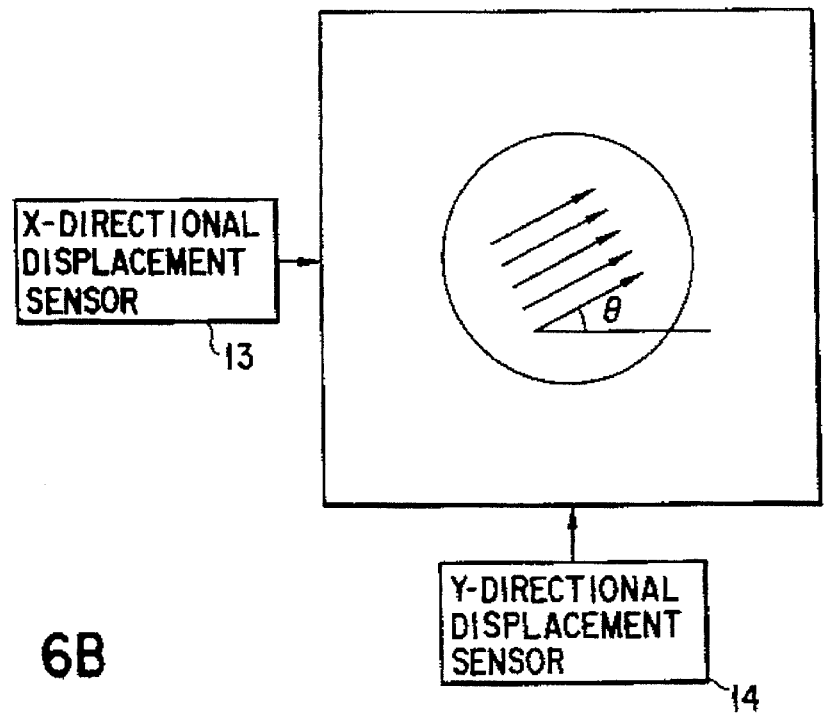
Figure 7A:
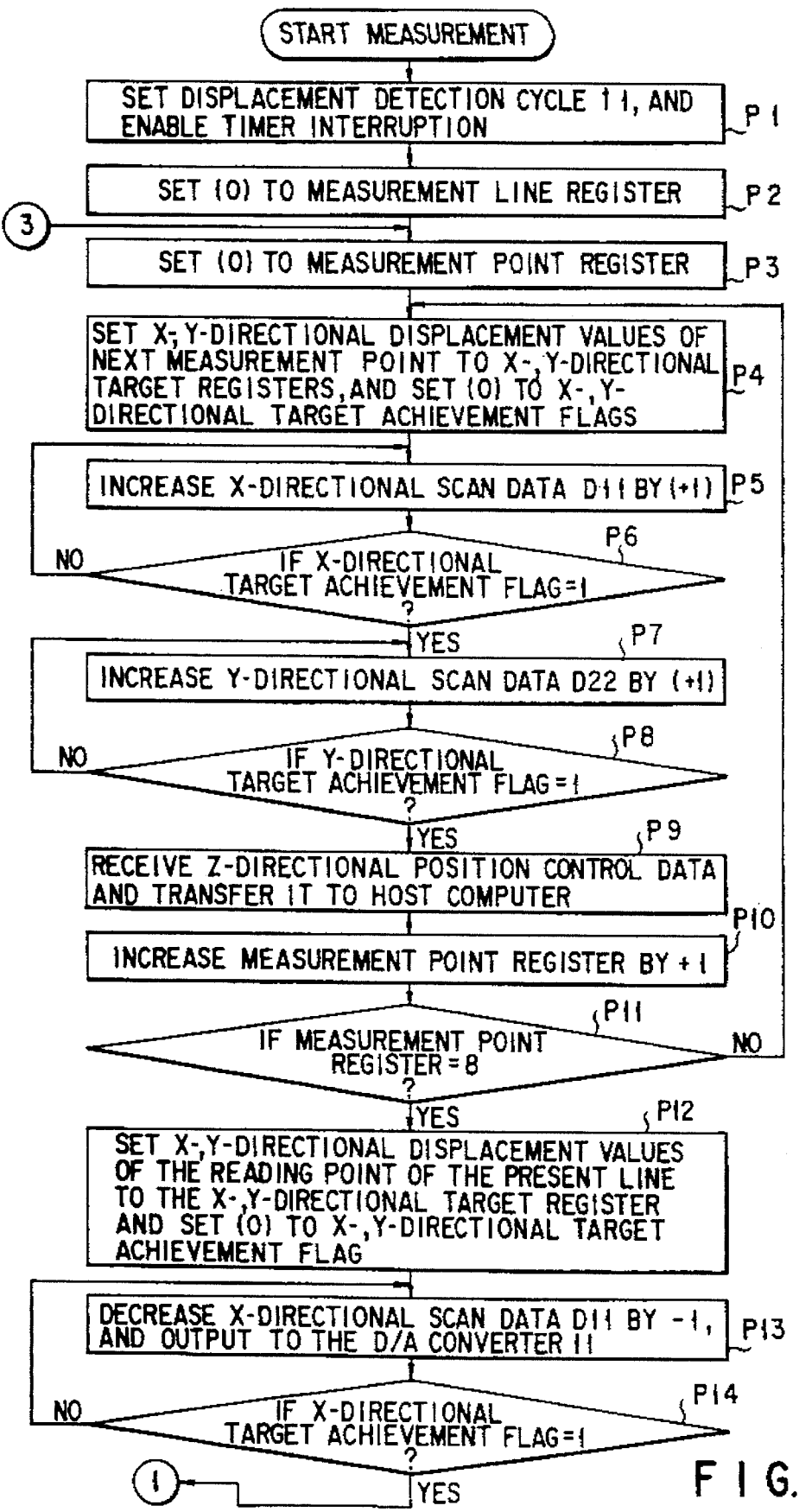
FIGS. 7A and 7B are flowcharts each illustrating an acquiring process of surface data in an SPM of another embodiment.
Figure 7B:
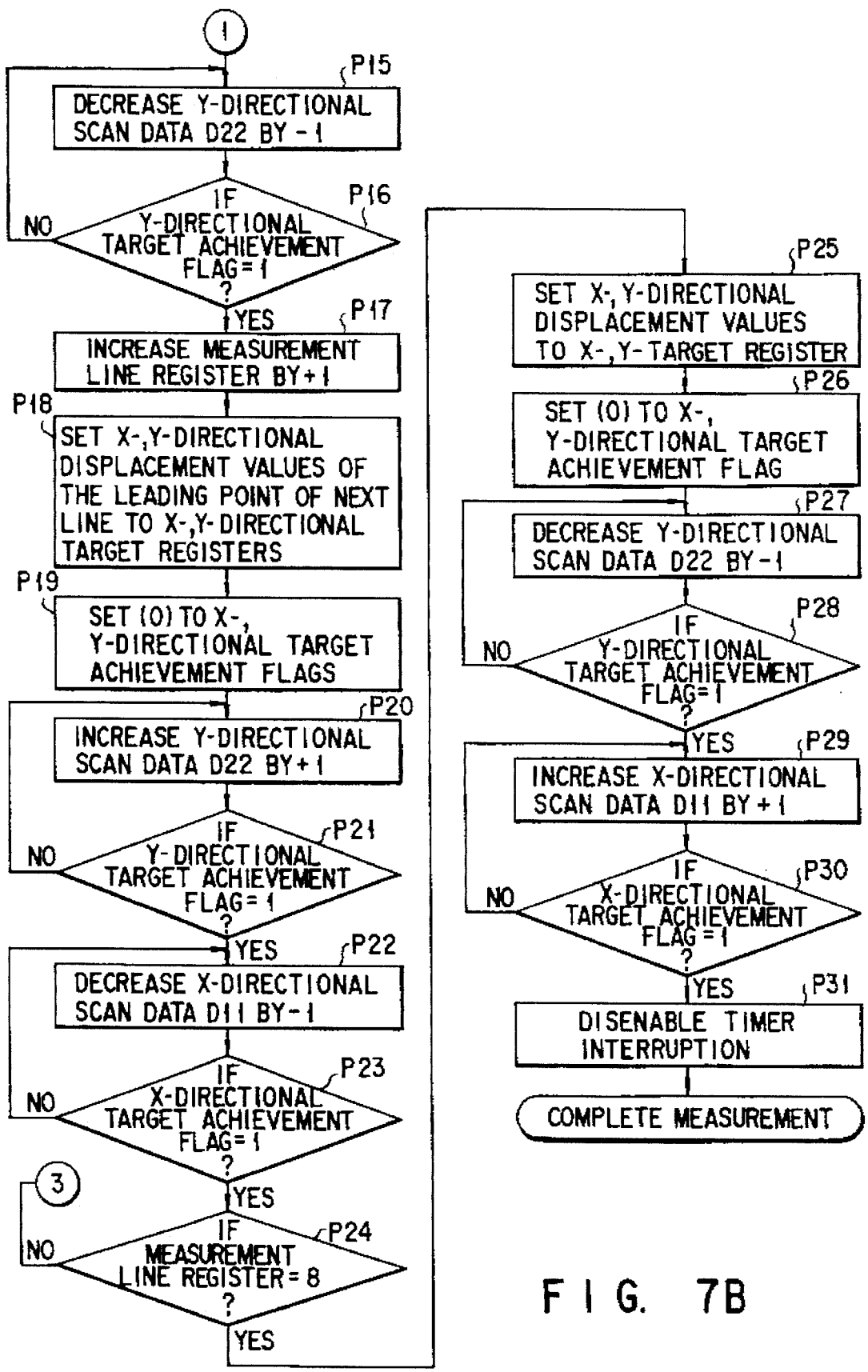
Figure 8:
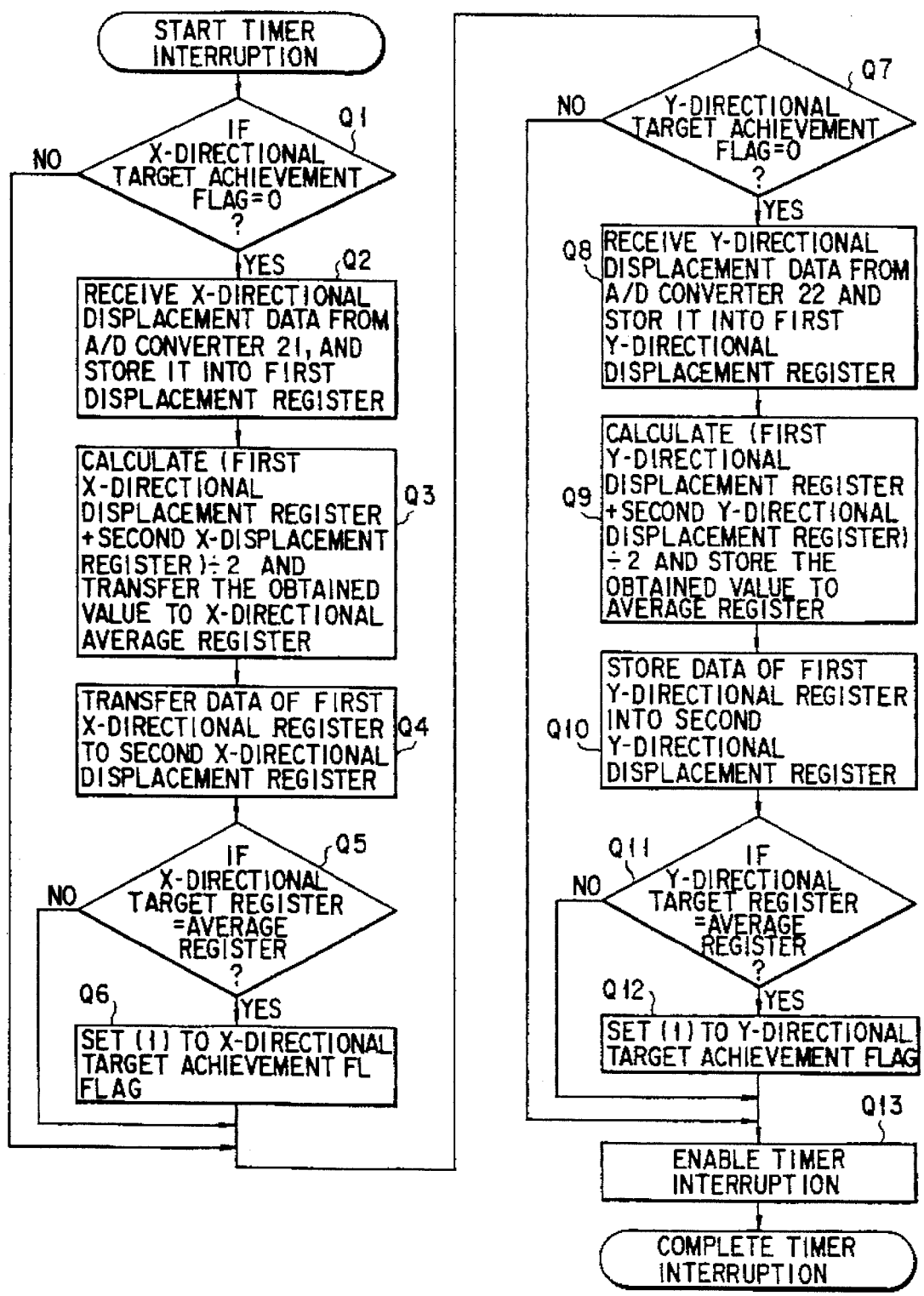
FIG. 8 is a flowchart each illustrating a timer interruption process in the SPM of another embodiment.
Figure 9:
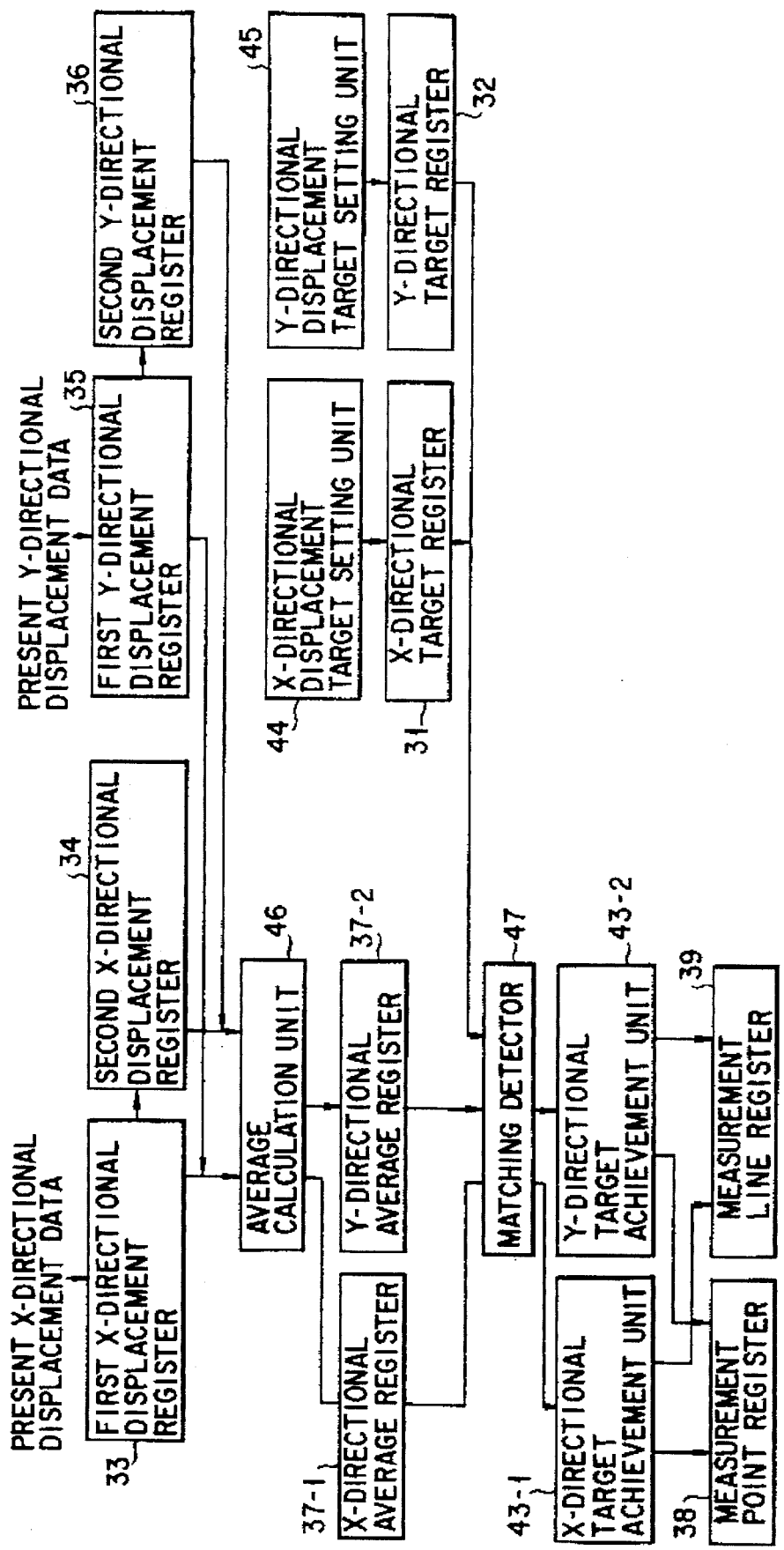
FIG. 9 is a diagram showing the register/flag structure in the SPM of another embodiment.

Another embodiment in which the sample stage 3 is scanned obliquely with respect to the X direction or Y direction (angle of θ), as shown in FIG. 6B will be described. The SPM of this embodiment has basically the same hardware structure as shown in FIG. 1. In this embodiment, the measurement sequence programs illustrated in flowcharts of FIGS. 7A, 7B and FIG. 8 are stored in the microcomputer 20, and the register/flag structure shown in FIG. 19 is constructed in the microcomputer 20. More specifically, in this embodiment, an X-directional target achievement flag 43-1 for the X-directional scan and a Y-directional target achievement flag 43-2 for the Y-directional scan are provided, and an X-directional average register 37-1 for storing the average value of X-directional displacements and an Y-directional average register 37-2 for storing the average value of Y-directional displacements are provided. Further, in the timer interruption process routine, the detection of the X-directional displacement and the detection of the Y-directional detection are carried out at the same time.

When the initial setting is carried out in the processes of steps P1 to P3, X- and Y-directional displacement target values are set to X- and Y-directional displacement target registers 31 and 32 (step P4). Next, the increment of an X-directional scan data item D11 is repeated until the data item reaches the X-directional displacement target value (steps P5 and P6), and when the X-directional displacement reaches the X-directional displacement target value, the increment of a Y-directional scan data item D22 is repeated until the data item reaches the Y-directional displacement target value (steps P7 and P8). When both X and Y directional displacements reach their target points, a X position control data item D3 is read from a probe control unit 6, and transferred to a host computer 16 (step P9). X- and Y-directional displacement target values are updated (step P4) at the same time, and the X-directional scan and the Y-directional scan are repeated.

While updating the X- and Y-directional scan signals, the target achievement flags 43-1 and 43-2 are checked. In the case where either one of the flags does not reach the target, only that one of the flags which has not reached its target is continued to be updated.

In the updating of the displacement target values of X- and Y-directional displacement target setting unit 44 and 45, the next X-directional displacement target is set to the one obtained by adding $\Delta d \times \sin \theta$ to the present X-directional displacement target where the predetermined scanning angle is θ and the displacement of the interval of measurement points is $\Delta d$. The next Y-directional displacement target is set to the one obtained by adding $\Delta d \times \sin \theta$ to the present Y-directional displacement target. Further, when moving on to the next scan line, the target, which is the leading point of the next scan line, is set by adding $\Delta l \times \cos(\theta + 90°)$ and $\Delta l \times \sin(\theta + 90°)$ to the X-directional displacement and Y-directional displacement at the leading point of the present scan line, where the displacement of the interval of the scan lines is represented by $\Delta l$.

If the number of measurement points on one line reaches the predetermined number, 8 (n= 8), the distance up to the leading point of the present line is set as the displacement target to both X- and Y-directional registers 31 and 32 (step P12). Next, the X-directional position on the scan line is moved back to the scan starting point by the processes of steps P15 and P16. Thus, a scanning operation in an oblique direction is performed. From this point on, the X-directional scan and the Y-directional scan are repeated at the same time in a similar manner to the above, and when the scanning of the predetermined number of measurement lines is finished, the X- and Y-directional target values are set back to the original positions, and the sample stage 3 is moved back to the original position.

In the meantime, the interruption process illustrated in FIG. 8 is performed at an initialized cycle t1. More specifically, in similar to the case of the preceding embodiment, it is judged in the processes of steps Q1 to Q6 whether or not the target value has been achieved, by averaging X-directional displacement data items D5. Further, in similar to the case of the preceding embodiment, it is judged in the processes of steps Q7 to Q12 whether or not the target value has been achieved, by averaging Y-directional displacement data items D6. When the two judgments have been conducted, the timer interruption is enabled (step Q13), and the interruption process is completed.

In the embodiment described above, not only X- and Y-directional scan displacements can be simultaneously monitored, but also the scan in an oblique direction can be performed as a two-dimensional scan without being influenced by the movement of the piezoelectric unit or the voltage hysteretic property, and with reduced noise of the displacement sensor. Therefore, sample surface data measurement of a high resolution, a high linearity and a high accuracy can be achieved in a similar manner to the preceding embodiment.

In the above two embodiments, the matching detection of the displacement data and the displacement target value is executed by the timer interruption process; however the timer interruption process can be built in a series of processes for acquiring the Z position control data.

For example, in the former embodiment, the processes of steps T3 to T7 in FIG. 8 can be inserted between step S5 and step S6, and between step S10 and step S11 in FIG. 2A. The processes of steps T9 to T13 of FIG. 3 can be inserted between step S17 and step S18 in FIG. 2B, and between step A21 and step A22 of FIG. 2B.

Further, in the latter embodiment, the processes of steps Q2 to Q6 in FIG. 8 can be inserted between step P5 and step P6, between step P13 and P14, step P22 and step P23 and between step P29 and step P30 in FIGS. 7A and 7B. Further, steps Q8 to Q12 in FIG. 8 can be inserted between step P7 and P8, between step P15 and step P16, step P20 and step P21, and between step 27 and step 28 in FIGS. 7A and 7B.

The present invention is not limited to the preceding embodiments, but may be remodeled as follows. In these embodiments, the sample surface data measurement is carried out at 8 points on each scan line, and the number of scan lines is 8; however the numbers of measurement points and measurement lines are arbitrary. Further, the number of times displacement detection values are averaged is 2; however, naturally, the noise can be reduced further as the total number of times of averaging increases.

Further, the microcomputer 20 may be replaced with a control IC such as a digital signal processor (DSP) having the same function as that of the microcomputer. It is also possible that the function of the matching detection unit 47 be replaced with a logic IC process, or that the function of the average calculation unit 46 be replaced with a filtering process carried out as another digital signal processing, or an analog filtering process in a pre-stage of the A/D conversion.

In the above-described embodiments, the present invention is applied to an atomic force microscope (AFM) for the measurement of the sample surface configuration; but the present invention may also naturally be applied to other STMs including a scanning tunneling microscope (STM), nc-AFM and MFM.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A scanning probe microscope for obtaining surface data of a sample by scanning a surface of the sample with a probe, at least one of the probe and the sample being movable relative to the other, said scanning probe microscope comprising:

a piezoelectric unit capable of finely moving in a Z direction coinciding with an axis along which the sample and the probe face each other, and in at least one direction normal to the Z direction, said at least one direction normal to the Z direction comprising an X direction;

probe control means for controlling a fine movement amount of said piezoelectric unit along the Z direction by detecting an interaction between the sample and the probe, changing a value of a Z-directional control signal which is applied to said piezoelectric unit in accordance with a magnitude of the detected interaction between said sample and said probe, and feeding the Z-directional control signal back to said piezoelectric unit;

X-directional driving means for applying to said piezoelectric unit an X-directional scan signal for controlling an X-directional fine movement amount of said piezoelectric unit and continuously changing a voltage value of the X-directional scan signal while an X-directional scan line on the surface of the sample is being scanned;

X-directional displacement detection means for detecting a displacement of said piezoelectric unit in the X direction and outputting an X-directional displacement detection signal having a signal value corresponding to the displacement detected;

matching detection means for detecting the X-directional displacement detection signal output by the X-directional displacement detection means and outputting a coincidence detection signal each time the signal value of the X-directional displacement detection signal coincides with one of X-directional displacement target values respectively preset for each X-directional scan line to correspond to X-directional measurement points at which sample surface data is to be acquired; and surface data acquiring means for acquiring sample surface data by determining the value of the Z-directional control signal applied by said probe control means to said piezoelectric unit each time said matching detection means outputs the coincidence detection signal.

2. A scanning probe microscope according to claim 1, further comprising: averaging means for sampling the X-directional displacement detection signal output from the X-directional displacement detection means at a constant cycle, averaging every certain set of consecutive sampling values obtained by the sampling, and supplying the average value to said matching detection means as the X-directional displacement amount.

3. A scanning probe microscope according to claim 1, further comprising:

a measurement point register for storing the number of measurement points already measured on a scan line;

measurement point number updating means for increasing the measurement point number set in said measurement point register when said matching detection means outputs the coincidence detection signal;

an X-directional target register for storing said X-directional displacement target value; and X-directional displacement target setting means for updating said X-directional displacement target value of said X-directional target register and setting an updated value to a next measurement point on said scan line each time the measurement point number of said measurement point register is updated, until the measurement point number reaches a predetermined value.

4. A scanning probe microscope according to claim 1, further comprising:

averaging means for sampling the X-directional displacement detection signal output from the X-directional displacement detection means at a constant cycle, averaging every certain set of consecutive sampling values obtained by the sampling, and supplying the average value to said matching detection means as the X-directional displacement amount;

a measurement point register for storing the number of measurement points already measured on a scan line;

measurement point number updating means for increasing the measurement point number set in said measurement point register when said matching detection means outputs the coincidence detection signal;

an X-directional target register for storing said X-directional displacement target value; and X-directional displacement target setting means for updating said X-directional displacement target value of said X-directional target register and setting an updated value to a next measurement point on said scan line each time the measurement point number of said measurement point register is updated, until the measurement point number reaches a predetermined value.

5. A scanning probe microscope according to claim 1, wherein said X-directional driving means includes a digital-analog converter for converting digital data indicating the voltage value of said X-directional scan signal into an analog signal and applying the analog signal as said X-directional scan signal to a predetermined electrode provided in said piezoelectric unit; and wherein said matching detection means includes an analog-digital converter for converting said X-directional displacement detection signal output from said X-directional displacement detection means into digital data indicating an X-directional displacement.

6. A scanning probe microscope according to claim 2, further comprising timer means for outputting a timer interruption signal, wherein said matching detection means and said averaging means are initialized when said timer means outputs said timer interruption signal.

7. A scanning probe microscope according to claim 4, further comprising timer means for outputting a timer interruption signal, wherein said matching detection means and said averaging means are initialized when said timer means outputs said timer interruption signal.

8. A scanning probe microscope for obtaining surface data of a sample by scanning a surface of the sample with a probe, at least one of the probe and the sample being movable relative to the other, said scanning probe microscope comprising:

a piezoelectric unit capable of finely moving in a Z direction coinciding with an axis along which the sample and the probe face each other, and X and Y directions normal to the Z direction;

probe control means for controlling a fine movement amount of said piezoelectric unit along the Z direction by detecting an interaction between the sample and the probe, changing a value of a Z-directional control signal which is applied to said piezoelectric unit in accordance with a magnitude of the detected interaction between said sample and said probe, and feeding the Z-directional control signal back to said piezoelectric unit;

X-directional driving means for applying to said piezoelectric unit an X-directional scan signal for controlling an X-directional fine movement amount of said piezoelectric unit and continuously changing a voltage value of the X-directional scan signal while an X-directional scan flag is in a first state;

Y-directional driving means for applying to said piezoelectric unit a Y-directional driving signal for controlling a Y-directional fine movement amount of said piezoelectric unit and continuously changing a voltage value of the Y-directional driving signal while a Y-directional flag is in a first state;

X-directional displacement detection means for detecting a displacement of said piezoelectric unit in the X direction and outputting an X-directional displacement detection signal having a signal value corresponding to the displacement detected;

Y-directional displacement detection means for detecting a displacement of said piezoelectric unit in the Y direction and outputting a Y-directional displacement detection signal having a signal value corresponding to the displacement detected;

matching detection means for detecting said X-directional and Y-directional displacement detection signals respectively output by said X-directional and Y-directional displacement detection means, outputting an X-directional coincidence detection signal each time the signal value of the X-directional displacement detection signal coincides with one of X-directional displacement target values respectively preset for each X-directional scan line to correspond to X-directional measurement points at which sample surface data is to be acquired, and outputting a Y-directional coincidence detection signal each time the signal value of the Y-directional displacement detection signal coincides with one of Y-directional displacement target values respectively preset to correspond to Y-directional fine movement amounts;

scan flag updating means for setting said X-directional scan flag in the first state and said Y-directional flag in a second state during an X-directional scan wherein the sample is being scanned along an X-directional scan line, setting said X-directional scan flag in a second state and said Y-directional flag in the first state when scanning of each X-directional scan line is complete, and setting said X-directional scan flag in the first state and said Y-directional flag in the second state when said matching detection means outputs the Y-directional coincidence detection signal; and surface data acquiring means for acquiring sample surface data by determining the value of the Z-directional control signal applied by said probe control means to said piezoelectric unit each time said matching detection means outputs the X-directional coincidence detection signal.

9. A scanning probe microscope according to claim 8, further comprising: averaging means for sampling said X-directional displacement detection signal output and said Y-directional displacement detection signal output at a constant time period, averaging every certain set of consecutive sampling values obtained by the sampling, and supplying the average value to said matching detection means as the X-directional displacement amount and the Y-directional displacement amount.

10. A scanning probe microscope according to claim 8, further comprising:

a measurement point register for storing the number of measurement points already measured on a scan line;

a measurement line register for storing the number of scan lines already measured;

measurement point number updating means for increasing the measurement point number set in said measurement point register when said matching detection means outputs the X-directional coincidence detection signal;

measurement line updating means for increasing the measurement line number set in said measurement line register when the measurement point number stored in said measurement point register reaches a predetermined value;

an X-directional target register for storing said X-directional displacement target value;

X-directional displacement target setting means for updating said X-directional displacement target value of said X-directional target register and setting an updated value to a next measurement point on said scan line each time the measurement point number of said measurement point register is updated, until the measurement point number reaches a predetermined value;

a Y-directional target register for storing said Y-directional displacement target value; and Y-directional displacement target setting means for updating said Y-directional displacement target value of said Y-directional target register and setting an updated value to a next measurement point on said scan line each time the measurement point number of said measurement point register is updated, until the measurement point number reaches a predetermined value.

11. A scanning probe microscope according to claim 10, further comprising:

averaging means for sampling the X-directional displacement detection signal and the Y-directional displacement detection signal at a constant cycle, averaging every certain set of consecutive sampling values obtained by the sampling, and supplying the average value to the matching detection means as the X-directional displacement amount and the Y-directional displacement amount.

12. A scanning probe microscope according to claim 9, further comprising timer means for outputting a timer interruption signal, wherein said matching detection means and said averaging means are initialized when said timer means outputs said timer interruption signal.

13. A scanning probe microscope according to claim 10, further comprising timer means for outputting a timer interruption signal, wherein said matching detection means and said averaging means are initialized when said timer means outputs said timer interruption signal.

14. A scanning probe microscope for obtaining surface data of a sample by scanning a surface of the sample with a probe, at least one of the probe and the sample being movable relative to the other, said scanning probe microscope comprising:

a piezoelectric unit capable of finely moving in a Z direction coinciding with an axis along which the sample and the probe face each other, and X and Y directions normal to the Z direction;

probe control means for controlling a fine movement amount of said piezoelectric unit along the Z direction by detecting an interaction between the sample and the probe, changing a value of a Z-directional control signal which is applied to said piezoelectric unit in accordance with a magnitude of the detected interaction between said sample and said probe, and feeding the Z-directional control signal back to said piezoelectric unit;

X-directional driving means for applying to said piezoelectric unit an X-directional scan signal for controlling an X-directional fine movement amount of said piezoelectric unit and continuously changing a voltage value of the X-directional scan signal while an X-directional target achievement flag is in a first state;

Y-directional driving means for applying to said piezoelectric unit a Y-directional scan signal for controlling a Y-directional fine movement amount of said piezoelectric unit and continuously changing a voltage value of the Y-directional scan signal while a Y-directional target achievement flag is in a first state;

X-directional displacement detection means for detecting a displacement of said piezoelectric unit in the X direction and outputting a X-directional displacement detection signal having a signal value corresponding to the displacement detected;

Y-directional displacement detection means for detecting a displacement of said piezoelectric unit in the Y direction and outputting a Y-directional displacement detection signal having a signal value corresponding to the displacement detected;

matching detection means for detecting said X-directional and Y-directional displacement detection signals respectively output by said X-directional and Y-directional displacement detection means, outputting an X-directional coincidence detection signal each time the signal value of the X-directional displacement detection signal coincides with one of X-directional displacement target values respectively preset to correspond to X-directional measurement points at which sample surface data is to be acquired, and outputting a Y-directional coincidence detection signal each time the signal value of the Y-directional displacement detection signal coincides with one of Y-directional displacement target values respectively preset to correspond to Y-directional measurement points at which sample surface data is to be acquired;

flag updating means for setting both said X-directional target achievement flag and said Y-directional target achievement flag in the first state when scanning of a scan line is initiated, setting said X-directional target achievement flag in a second state when the matching detection means outputs the X-directional coincidence detection signal, and setting said Y-directional target achievement flag in a second state when the matching detection means outputs the Y-directional coincidence detection signal; and surface data acquiring means for acquiring sample surface data by determining the value of the Z-directional control signal applied by said probe control means to said piezoelectric unit each time both said X-directional target achievement flag and said Y-directional target achievement flag are simultaneously each set in the second state;

said flag updating means further including means for resetting each of said X-directional target achievement flag and said Y-directional target achievement flag to the first state when both said X-directional target achievement flag and said Y-directional target achievement flat are simultaneously each set in the second state.

15. A scanning probe microscope according to claim 14, further comprising: averaging means for sampling said X-directional displacement detection signal output and said Y-directional displacement detection signal output at a constant cycle, averaging every certain set of consecutive sampling values obtained by the sampling, and supplying the average value to the matching detection means as the X-directional displacement amount and the Y-directional displacement amount.

16. A scanning probe microscope according to claim 14, further comprising:

a measurement point register for storing the number of measurement points already measured on a scan line;

a measurement line register for storing the number of scan lines already measured;

measurement point number updating means for increasing the measurement point number set in said measurement point register when said matching detection means outputs both the X-directional and the Y-directional, measurement line updating means for increasing the measurement lines number set in said measurement line register when the measurement point number stored in said measurement point register reaches a predetermined value;

an X-directional target register for storing said X-directional displacement target value;

X-directional displacement target setting means for updating said X-directional displacement target value of said X-directional target register by d×cos θ, where d is a distance to the next measurement point on the scan line and θ is an angle made between a scan line and a line parallel to the X direction each time the measurement point number of said measurement point register is updated, until the measurement point number reaches a predetermined value;

an Y-directional target register for storing said Y-directional displacement target value; and Y-directional displacement target setting means for updating said Y-directional displacement target value of said Y-directional target register by d×sin θ each time the measurement point number of said measurement point register is updated, until the measurement point number reaches a predetermined value.

17. A method of obtaining surface data of a sample using a scanning probe microscope having a probe for scanning a surface of the sample and a piezoelectric unit capable of finely moving in a Z direction and at least one direction normal to the Z direction, said Z direction coinciding with an axis along which the sample and the probe face each other and said at least one direction normal to the Z direction comprising an X direction, at least one of the sample and the probe being movable relative to the other, said method comprising:

a) a Z-directional control step for controlling a fine movement of said piezoelectric unit in the Z direction while the surface of said sample is scanned;

b) an X-directional scan step for finely moving said piezoelectric unit in the X direction;

c) an acquiring step for acquiring sample surface data;

said Z-directional control step a) including the following substeps of:

i) detecting an interaction between said sample and said probe;

ii) changing a value of a Z-directional control signal which is applied to said piezoelectric unit in accordance with a magnitude of the detected interaction between said sample and said probe; and iii) feeding the Z-directional control signal back to said piezoelectric unit;

said X-directional scan step b) including the following substeps of:

i) applying to said piezoelectric unit an X-directional scan signal for controlling an X-directional fine movement amount of said piezoelectric unit; and ii) continuously changing a voltage value of the X-directional scan signal while an X-directional scan line on the surface of the sample is being scanned; and said acquiring step c) including the following substeps of:

i) detecting the X-directional displacement amount of said piezoelectric unit in the X direction and outputting an X-directional displacement signal having a signal value corresponding to the displacement detected;

ii) outputting a coincidence detection signal each time the signal value of the X-directional displacement signal coincides with one of X-directional displacement target values respectively preset for each X-directional scan line to correspond to X-directional measurement points at which the surface data is to be acquired; and iii) acquiring sample surface data by determining the value of said Z-directional control signal applied by said probe means to said piezoelectric unit each time the coincidence detection signal is output.

18. A measurement method according to claim 17, wherein said acquiring step further includes the following substeps of:

i) sampling the X-directional displacement amount of said piezoelectric unit at a constant cycle; and ii) averaging every certain set of consecutive sampling values obtained by the sampling so as to determine the X-directional displacement amount.

19. A method of obtaining surface data of a sample using a scanning probe microscope having a probe for scanning a surface of the sample and a piezoelectric unit capable of finely moving in a Z direction and X and Y directions normal to the Z direction, said Z direction coinciding with an axis along which the sample and the probe face each other and at least one of the sample and the probe being movable relative to the other, said method comprising:

a) a Z-directional control step for controlling a fine movement of said piezoelectric unit in the Z direction while the surface of said sample is scanned;

b) an X-directional scan step for finely moving said piezoelectric unit in the X direction;

c) a Y-directional drive step for finely moving said piezoelectric unit in the Y direction; and d) an acquiring step for acquiring sample surface data;

said Z-directional control step a) including the following substeps of:
  i) detecting an interaction between said sample and said probe;
  ii) changing a value of a Z-directional control signal which is applied to said piezoelectric unit in accordance with a magnitude of the detected interaction between said sample and said probe; and
  iii) feeding the Z-directional control signal back to said piezoelectric unit;

said X-directional scan step b) including the following substeps of:
  i) applying to said piezoelectric unit an X-directional scan signal for controlling an X-directional fine movement amount of said piezoelectric unit; and
  ii) continuously changing a voltage value of the X-directional scan signal while an X-directional scan flag is in a first state;

said Y-directional drive step c) including the following substeps of:
  i) applying to said piezoelectric unit a Y-directional driving signal for controlling a Y-directional fine movement amount of said piezoelectric unit; and
  ii) continuously changing a voltage value of a Y-directional driving signal while a Y-directional flag is in a first state; and said acquiring step d) including the following substeps of:
  i) detecting the X-directional displacement amount of said piezoelectric unit in the X direction and outputting an X-directional displacement signal having a signal value corresponding to the displacement detected;
  ii) detecting the Y-directional displacement amount of said piezoelectric unit in the Y direction and outputting a Y-directional displacement signal having a signal value corresponding to the displacement detected;
  iii) outputting a coincidence detection signal each time the signal value of the X-directional displacement signal coincides with one of X-directional displacement target values respectively preset for each X-directional scan line to correspond to X-directional measurement points at which the surface data is to be acquired;
  iv) outputting a coincidence detection signal each time the signal value of the Y-directional displacement signal coincides with one of Y-directional displacement target values respectively preset to correspond to Y-directional fine movement amounts;
  v) setting the X-directional scan flag in the first state and the Y-directional flag in a second state during an X-directional scan wherein the sample is being scanned along an X-directional scan line, setting the X-directional flag in a second state and the Y-directional flag in the first state when scanning of each X-directional scan line is completed, and setting the X-directional scan flag in the first state and the Y-directional flag in the second state when the Y-directional coincidence detection signal is output; and
  vi) acquiring sample surface data by determining the value of said Z-directional control signal applied by said probe means to said piezoelectric unit each time the X-directional coincidence detection signal is output.

20. A method of obtaining surface data of a sample using a scanning probe microscope having a probe for scanning a surface of the sample and a piezoelectric unit capable of finely moving in a Z direction and X and Y directions normal to the Z direction, said Z direction coinciding with an axis along which the sample and the probe face each other and at least one of the sample and the probe being movable relative to the other, said method comprising:

a) a Z-directional control step for controlling a fine movement of said piezoelectric unit in the Z direction while the surface of said sample is scanned;

b) an X-directional scan step for finely moving said piezoelectric unit in the X direction;

c) a Y-directional scan step for finely moving said piezoelectric unit in the Y direction; and d) an acquiring step for acquiring sample surface data;

said Z-directional control step a) including the following substeps of:
  i) detecting an interaction between said sample and said probe;
  ii) changing a value of a Z-directional control signal which is applied to said piezoelectric unit in accordance with a magnitude of the detected interaction between said sample and said probe; and
  iii) feeding the Z-directional control signal back to said piezoelectric unit;

said X-directional scan step b) including the following substeps of:
  i) applying to said piezoelectric unit an X-directional scan signal for controlling an X-directional fine movement amount of said piezoelectric unit; and
  ii) continuously changing a voltage value of the X-directional scan signal while an X-directional target achievement flag is in a first state;

said Y-directional scan step c) including the following substeps of:
  i) applying to said piezoelectric unit a Y-directional scan signal for controlling an Y-directional fine movement amount of said piezoelectric unit; and
  ii) continuously changing a voltage value of a Y-directional scan signal while a Y-directional target achievement flag is in a first state; and said acquiring step d) including the following substeps of:
  i) detecting the X-directional displacement amount of said piezoelectric unit in the X direction and outputting an X-directional displacement signal having a signal value corresponding to the displacement detected;
  ii) detecting the Y-directional displacement amount of said piezoelectric unit in the Y direction and outputting a Y-directional displacement signal having a signal value corresponding to the displacement detected;
  iii) outputting a coincidence detection signal each time the signal value of the X-directional displacement signal coincides with one of X-directional displacement target values respectively preset to correspond to X-directional measurement points at which the surface data is to be acquired;

iv) outputting a coincidence detection signal each time the signal value of the Y-directional displacement signal coincides with one of Y-directional displacement target values respectively preset to correspond to Y-directional measurement points at which the surface data is to be acquired;

v) setting both the X-directional target achievement flag and the Y-directional target achievement flag in the first state when scanning of a scan line is initiated;

vi) setting the X-directional target achievement flag in a second state when the X-directional coincidence detection signal is output;

vii) setting the Y-directional target achievement flag in a second state when the Y-directional coincidence detection signal is output;

viii) acquiring sample surface data by determining the value of said Z-directional control signal applied by said probe means to said piezoelectric unit each time both said X-directional target achievement flag and said Y-directional target achievement flag are simultaneously each set in the second state; and ix) resetting each of the X-directional target achievement flag and the Y-directional target achievement flag to the first state when both the X-directional target achievement flag and the Y-directional target achievement flag are simultaneously each set in the second state.

21. A scanning probe microscope for obtaining surface data of a sample by scanning a surface of the sample with a probe, at least one of the probe and the sample being movable relative to the other, said scanning probe microscope comprising:

a piezoelectric unit capable of finely moving in a Z direction coinciding with an axis along which the sample and the probe face each other, and in at least one direction normal to the Z direction, said at least one direction normal to the Z direction comprising an X direction;

probe control means for controlling a fine movement amount of said piezoelectric unit along the Z direction by detecting an interaction between the sample and the probe, changing a value of a Z-directional control signal which is applied to said piezoelectric unit in accordance with a magnitude of the detected interaction between said sample and said probe, and feeding the Z-directional control signal back to said piezoelectric unit;

X-directional driving means for applying to said piezoelectric unit an X-directional scan signal for controlling an X-directional fine movement amount of said piezoelectric unit and continuously changing a voltage value of the X-directional scan signal while an X-directional scan line on the surface of the sample is being scanned, said X-directional driving means including a digital-analog converter for converting digital data indicating the voltage value of said X-directional scan signal into an analog signal and applying the analog signal as said X-directional scan signal to a predetermined electrode provided in said piezoelectric unit;

X-directional displacement detection means for detecting a displacement of said piezoelectric unit in the X direction and outputting an X-directional displacement detection signal having a signal value corresponding to the displacement detected;

matching detection means for detecting the X-directional displacement detection signal output by the X-directional displacement detection means and outputting a coincidence detection signal each time the signal value of the X-directional displacement detection signal coincides with one of X-directional displacement target values respectively preset for each X-directional scan line to correspond to X-directional measurement points at which sample surface data is to be acquired, said matching detection means including an analog-digital converter for converting said X-directional displacement detection signal output from said X-directional displacement detection means into digital data indicating an X-directional displacement; and surface data acquiring means for acquiring sample surface data by determining the value of the Z-directional control signal applied by said probe control means to said piezoelectric unit each time said matching detection means outputs the coincidence detection signal.

* * * * *